United States Patent [19]

Rathman et al.

[11] Patent Number: 5,035,604
[45] Date of Patent: Jul. 30, 1991

[54] BLOW MOLDING AND COMPRESSION MOLDING OF AN ARTICLE

[75] Inventors: John R. Rathman; Donald L. Peters; Jimmie L. Dean, all of Bartlesville, Okla.

[73] Assignee: Phillips Petroleum Company, Bartlesville, Okla.

[21] Appl. No.: 519,623

[22] Filed: May 4, 1990

[51] Int. Cl.⁵ .............................................. B29C 49/42
[52] U.S. Cl. .................................. 425/525; 264/534
[58] Field of Search .................. 425/522, 525, 532; 264/531, 533, 534

[56] References Cited

U.S. PATENT DOCUMENTS

| | | | |
|---|---|---|---|
| 3,050,773 | 8/1962 | Hagen | 264/534 |
| 3,115,682 | 12/1963 | Soubier et al. | 425/525 |
| 3,398,427 | 8/1968 | John | 425/525 X |
| 3,424,829 | 1/1969 | Peters et al. | 264/529 |
| 3,438,538 | 4/1969 | Peters | 220/288 |
| 3,764,644 | 10/1973 | Robinson | 264/531 |
| 3,792,143 | 2/1974 | Branscum et al. | 264/296 X |
| 3,960,474 | 6/1976 | Kader | 425/503 |
| 4,028,034 | 6/1977 | Hahn | 425/532 X |
| 4,070,429 | 1/1978 | Uhlig | 264/504 |
| 4,116,608 | 9/1978 | Uhlig | 425/525 |
| 4,170,623 | 10/1979 | Dubois et al. | 264/534 |
| 4,453,911 | 6/1984 | Watson et al. | 425/522 X |
| 4,510,116 | 4/1985 | Peters et al. | 264/529 |
| 4,761,130 | 8/1988 | Peters | 425/532 |
| 4,938,680 | 7/1990 | Guarriello et al. | 264/534 X |

Primary Examiner—Richard L. Chiesa
Attorney, Agent, or Firm—William R. Sharp

[57] ABSTRACT

A molding apparatus is provided which is operated to mold an article having a hollow blow molded portion and a substantially solid compression molded portion. A mold is provided which has defined therein at least a first cavity portion and a second cavity portion. A parison is positioned within the mold and blow gas is injected into the interior of the parison to inflate the parison within each of the cavity portions. A compression member is then moved from a retracted position within a recess in the mold to an extended position outside of such recess. The compression member presses a first portion of the parison against the mold interior surface which defines the first cavity portion so as to compression mold a first portion of the parison. Inflation of a second portion of the parison in the second cavity portion accomplishes blow molding of such second parison portion.

16 Claims, 6 Drawing Sheets

BLOW MOLDING AND COMPRESSION MOLDING OF AN ARTICLE

This invention relates to an apparatus and method of molding an article wherein a portion of the article is blow molded and another portion is compression molded.

Blow molding processes are widely used to form hollow articles from plastic materials. Generally, a parison, which is a generally tubular blank of molten plastic material, is extruded from a suitable extrusion head and is allowed to drop by gravity into the interior of a mold. After upper and lower ends of the parison are sealed off by, for example, closing two mold parts upon the parison, a compressed gas such as air is injected into the parison to pneumatically expand the parison to fit the inside contours of the mold.

It is occasionally desirable to compression mold a portion of an article which is being blow molded. Such a need can arise, for example, in hollow articles which require an associated high strength, protruding member.

Prior techniques of combining blow molding and compression molding have been used with some success, but improvement would be desirable.

SUMMARY OF THE INVENTION

It is, therefore, an object of the invention to provide an improved apparatus and method for molding an article having at least one hollow blow molded portion and a solid compression molded portion.

The above object is realized by a molding apparatus comprising: extrusion means for extruding a molten generally tubular parison having a predetermined wall thickness; a mold means for receiving the extruded parison, wherein the mold means includes a first interior surface portion which defines a first cavity portion and a second interior surface portion which defines a second cavity portion, and also including a recess generally in alignment with the first cavity portion; a blow means for injecting blow gas into the interior of the parison within the mold means so as to expand the parison within each of the cavity portions; and a compression member which is mounted in the mold means so as to be reciprocable between a retracted position in which at least a portion of the compression member is disposed within the recess to an extended position in which at least part of such compression member portion is outside of the recess, wherein in the extended position at least a portion of the exterior surface of the compression member is adapted to be closely adjacent to the first interior surface portion so as to press only a portion of the parison against the first interior surface portion and thereby compression mold such a parison portion.

According to another aspect of the invention, there is provided a molding method which comprises: (a) providing a mold as described above; (b) positioning a molten generally tubular parison within the mold; (c) injecting a blow gas into the interior of the thus positioned parison so as to inflate the parison within each of the cavity portions; (d) after step (c), moving a compression member from a retracted position to an extended position as described above; (e) at least a portion of the exterior surface of the compression member being positioned at the completion of step (d) or after step (d) so as to press a first portion of the parison against the first interior surface portion to thereby compression mold the first parison portion; and (f) completing inflation of a second portion of the parison in the second cavity portion so as to blow mold the second parison portion.

According to a preferred embodiment of the invention, a plurality of mold sections are utilized which are in the open position at the beginning of the molding method, and which are moved to their respective closed positions at preselected points in the method in order to optimize the formation of a complete and well formed article having the desired hollow blow molded portion and solid compression molded portion.

Employing the reciprocable compression member in accordance with the invention is particularly advantageous over, for example, a system which utilizes a stationary member which cannot be retracted into one of the mold sections. By providing the capability of retracting the compression member from its extended compression molding position, this helps prevent possible tearing or thinning of the parison on the compression member during inflation of the parison before compression molding, and also provides better extension of the inflated parison into the cavity portion associated with compression molding, thereby insuring formation of a complete and well formed compression molded portion of the final article.

DETAILED DESCRIPTION OF THE PREFERRED EMBODIMENT

An embodiment of the invention will now be described with reference to the FIGURES. The particular embodiment illustrated and described pertains to molding of an article (i.e. container) having a hollow portion with compression molded protruding members extending therefrom. A handle is blow molded so as to be connected at one end to one protruding member and at the other end to the other protruding member. It should be understood that this particular embodiment is illustrated and described solely to assist an understanding of the invention, and further that the invention is applicable to any type and/or shape of article having a blow molded portion or portions and a compression molded portion or portions.

Figure 1:
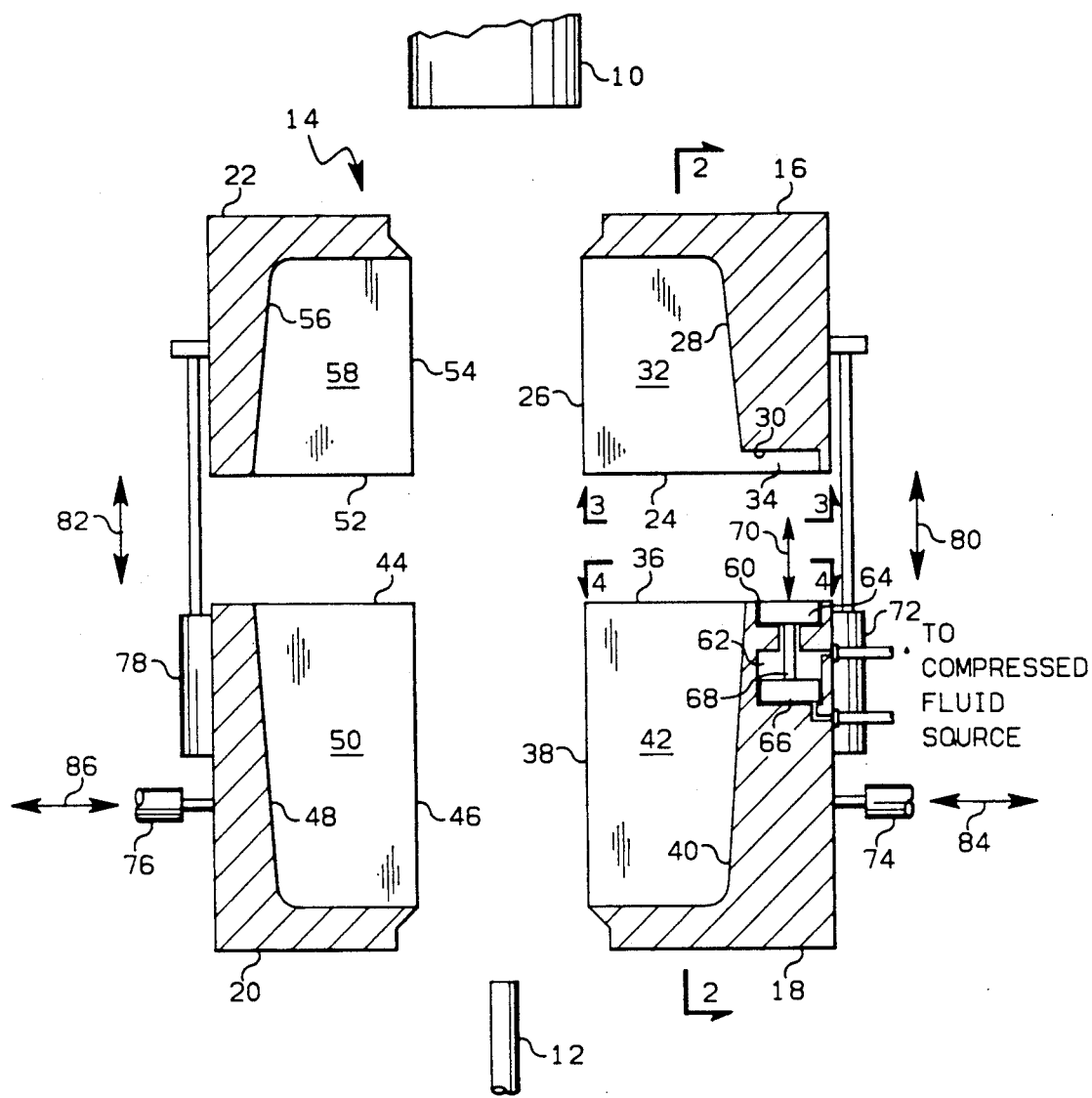
FIG. 1 is a partial, diagrammatic cross-sectional view of one embodiment of an apparatus in accordance with the invention, wherein the various mold sections are in their open positions.

Referring now to FIG. 1, the illustrated apparatus includes the lower portion of an extrusion head 10 which is capable of extruding a molten generally tubular parison. A blow pin 12, shown in its retracted position, is connected to a source of compressed gas, most typically air, and is most typically reciprocable between retracted and extended positions by a suitable pneumatic drive means (not shown).

The apparatus further includes a mold, generally indicated at 14, which includes separate mold sections 16, 18, 20 and 22. In FIG. 1 the various mold sections are shown in their respective open positions. Such mold sections have various interior surface portions which together make up the total interior surface of mold 14 when closed. The interior surface portions define corresponding cavity portions which make up the total mold cavity when mold 14 is closed.

With respect to individual mold sections, mold section 16 has faces 24 and 26, and interior surface portions 28 and 30 which define cavity portions 32 and 34, respectively. As shown, cavity portion 34 is directly adjacent to and in communication with cavity portion 32 so as to extend outwardly from the periphery of cavity portion 32. It can further be seen from FIG. 1 that cavity portion 34 extends from a lower end, directly adjacent to face 24, to its upper end which is offset from face 24. The entirety of cavity portion 34 is offset from face 26. Mold section 18 has faces 36 and 38, and further includes interior surface portion 40 which defines cavity portion 42. Mold section 20 has faces 44 and 46, and further includes interior surface portion 48 which defines cavity portion 50. Similarly, mold section 22 has faces 52 and 54, and further includes interior surface portion 56 which defines cavity portion 58.

It can be seen from FIG. 1 that face 24 matches face 36, face 38 matches face 46, face 44 matches face 52, and face 54 matches face 26. The various mold sections are closeable upon one another at such matching faces along mold closing lines (i.e. parting lines and/or flash lines) as will be described and shown in more detail with reference to FIGS. 5-10.

The apparatus of FIG. 1 is further characterized by: a recess 60 defined in mold section 18 so as to be separate from cavity portion 42 and in alignment with cavity portion 34; a chamber 62 also defined in mold section 18 so as to be separate from cavity portion 42; a compression member 64, shown in FIG. 1 as being in its retracted position disposed entirely within recess 60 but having its upper face substantially flush with face 36 of mold section 18; a piston 66 slidably disposed in chamber 62; and a shaft 68 connected at its upper end to compression member 64 and at its lower end to piston 66. Preferably, compression member 64 and piston 66 are of a metallic construction which is most preferably dissimilar from the type of metals defining recess 60 and chamber 62. Utilizing such dissimilar metals assists in preventing galling with respect to metal surfaces in sliding contact with one another. For example, if aluminum defines recess 60 one suitable metal for compression member 64 would be bronze. It is also preferable that the metal of compression member 64 have a high thermal conductivity in order to optimize cooling of the compression molded portions of the parison. Furthermore, although compression member 64 is shown in FIG. 1 as being in its retracted position, compression member 64 as operably connected to mold section 18 as described above is reciprocable between such retracted position and an extended position, as will be more apparent in subsequent FIGURES, along a generally vertical directional line as indicated at 70. A compressed fluid source for supplying a suitable hydraulic fluid such as oil or water is in fluid communication with chamber 62 by means of suitable flexible conduits and passageways in mold section 18 to the upper and lower ends of chamber 62. Therefore, piston 66 and associated shaft 68 and compression member 64 are hydraulically operable.

Also provided in the apparatus of FIG. 1 are means for moving mold sections between respective open and closed positioned, which in the illustrated embodiment includes hydraulic cylinders 72, 74, 76 and 78. For clarity of illustration, hydraulic supply lines to such hydraulic cylinders are not shown in FIG. 1.

With respect to individual hydraulic cylinders, hydraulic cylinder 72 is adapted to move mold section 16 downward from an open position to a closed position or upward from a closed position to an open position along a generally vertical directional line as indicated at 80. Hydraulic cylinder 78 is similarly adapted to move mold section 22 along a vertical directional line as indicated at 82. In the illustrated embodiment and as shown, directional lines 80 and 82 are generally parallel and are further parallel to directional line 70 along which compression member 60 is reciprocable. Hydraulic cylinder 74 is adapted to move mold section 18 along a horizontal directional line as indicated at 84 between open and closed positions. Hydraulic cylinder 76 is similarly adapted to move mold section 20 along a horizontal directional line as indicated at 86 between open and closed positions. Note that directional lines 84 and 86 are parallel and generally perpendicular to directional lines 70, 80 and 82. Of course, the various hydraulic cylinders could be connected to the mold sections differently from that illustrated. For example, such hydraulic cylinders could be connected to the mold sections in a manner which would permit closure of mold sections 16 and 22 upon mold sections 18 and 20, respectively, by upward movement of mold sections 18 and 20 rather than downward movement of mold sections 16 and 22.

Figure 2:
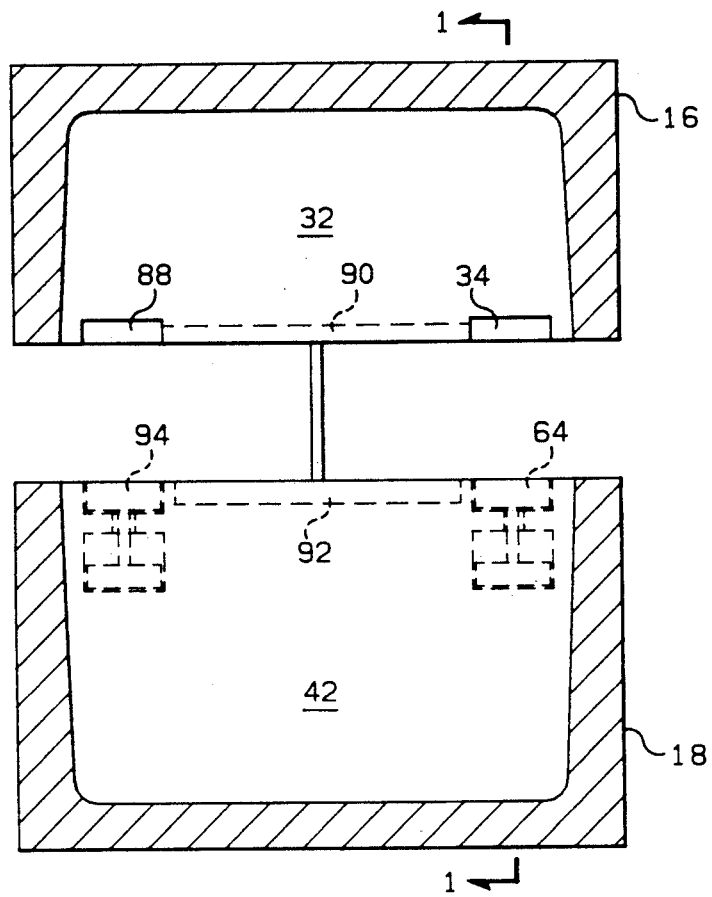
FIG. 2 is a diagrammatic cross sectional view of the apparatus of FIG. 1 as viewed along line 2—2.

Referring now to FIG. 2, there is shown another cross sectional view of the apparatus of FIG. 1 which shows mold section 16 and associated cavity portions 32 and 34. As shown, cavity portion 34 is positioned on one side of mold section 16, and a substantially identical cavity portion 88 is positioned on the other side of mold section 16 so as to also be directly adjacent to and in communication with cavity portion 32. An additional cavity portion 90, as depicted by broken lines and as indicated at 90, extends between cavity portion 34 and 88. FIG. 2 also shows mold section 18 and associated cavity portion 42. An additional cavity portion 92 is depicted by broken lines and is indicated at 92. Cavity portions 90 and 92 cooperate to form a cavity for blow molding a handle extending between cavity portions 34 and 88 as will become more apparent in subsequent FIGURES. Compression member 64 and associated shaft and piston are shown in broken lines as being directly beneath and in alignment with cavity portion 34. A substantially identical compression member 94, also having an associated shaft and piston, is positioned on the opposite side of mold section 18 beneath and in alignment with cavity portion 88.

Figure 3:
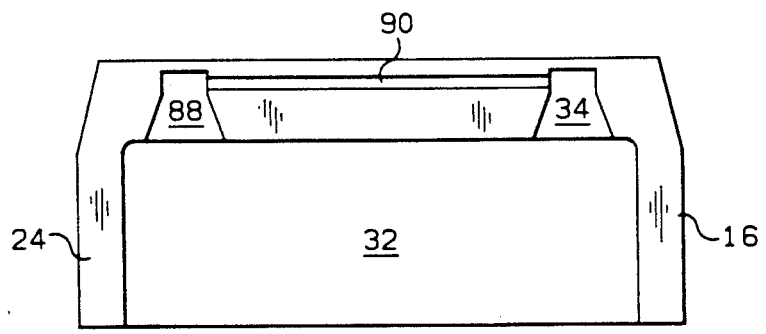
FIGS. 3 and 4 are views of particular mold sections of the FIG. 1 apparatus as viewed along lines 3—3 and 4—4, respectively.

Referring now to FIG. 3, there is shown another view of mold section 16 having cavity portions 32, 34, 88 and 90 defined therein. Also shown in FIG. 3 is face 24 of mold section 16.

Figure 4:
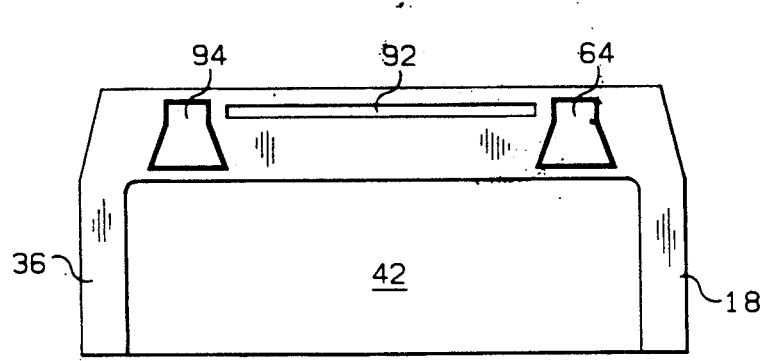

Referring now to FIG. 4, there is shown another view of mold section 18 having cavity portions 42 and 92 defined therein. Also shown in FIG. 4 are compression members 64 and 94 which are the same shape as and clearly mateable with cavity portions 34 and 88.

Although not shown, it is preferable to have an additional blow means, such as a blow needle, for injecting blow gas into cavity portions 90 and 92, since blow gas is prevented from reaching these cavity portions during compression molding within cavity portions 34 and 88, as will become more apparent below.

An embodiment of a method in accordance with the invention using the apparatus of FIG. 1 will now be described with reference to FIGS. 5-10.

Figure 5:
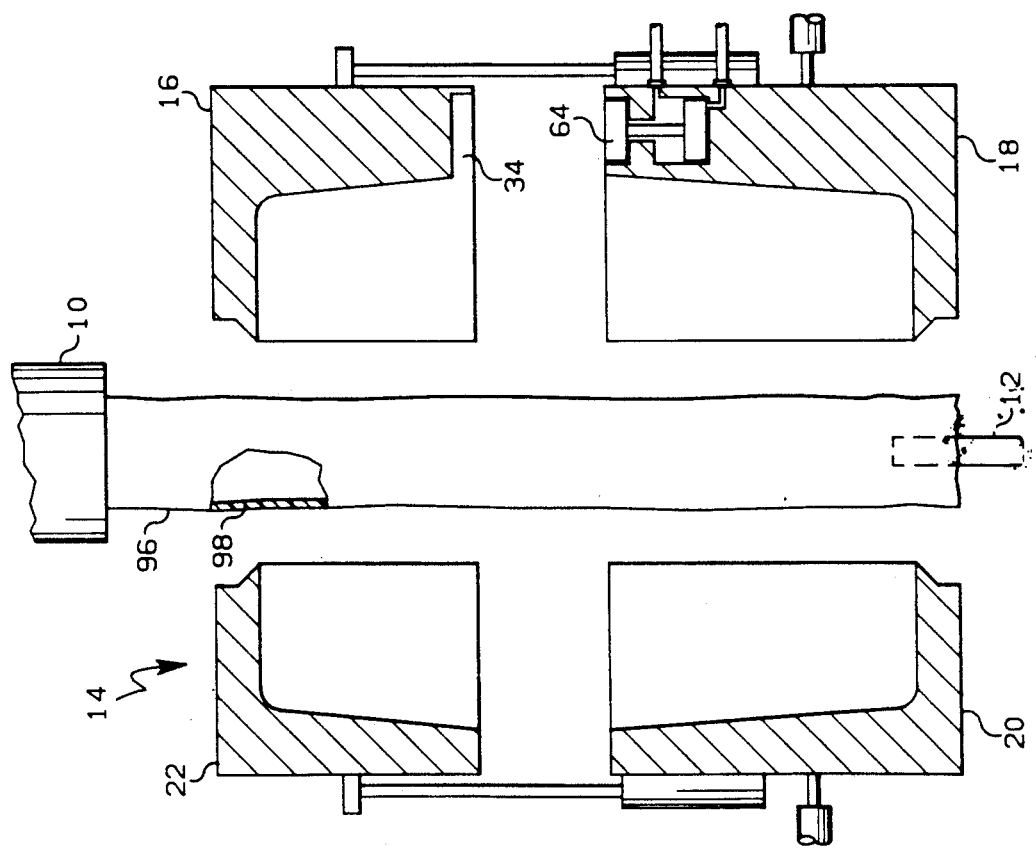

Referring to FIG. 5, mold 14 is shown with its respective mold sections 16, 18, 20 and 22 in their open positions. Blow pin 12, however, has been moved from its retracted position as shown in FIG. 1 to its extended position, after which a molten generally tubular parison 96 is extruded from extruder head 10 so as to drop by gravity to a position within mold 14 between the various mold sections as illustrated. Also as shown by the broken away portion of parison 96, parison 96 is hollow and has a wall 98 of predetermined thickness which is suitable for compression molding of a portion of the parison within cavity portion 34 by compression member 64, as will be described further below. Compression member 64 is shown in FIG. 5 as being in its retracted position at this point of the method.

Figure 6:
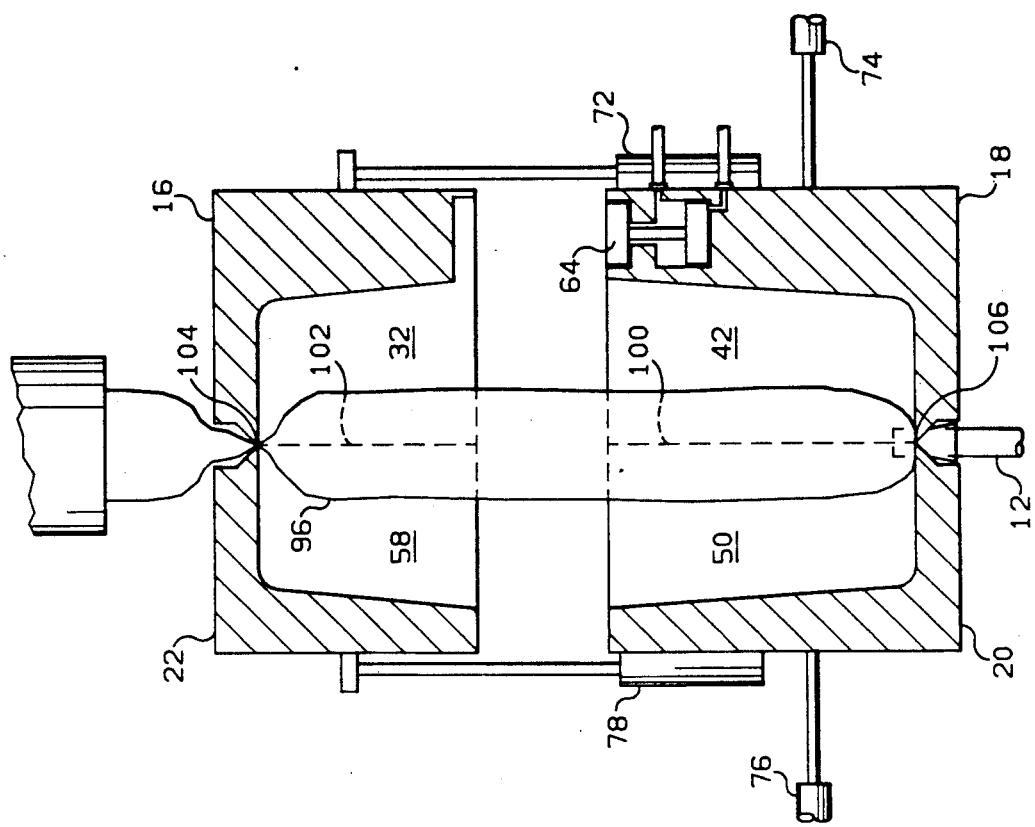
FIGS. 5-10 illustrate the apparatus of FIG. 1 at different stages of one embodiment of a method in accordance with the invention.

After parison 96 is extruded and positioned within mold 14 as described above, hydraulic cylinders 74 and 76 are activated so as to move mold sections 18 and 20 generally horizontally toward one another. As shown in FIG. 6, mold sections 18 and 20 accordingly close upon one another at their respective matching faces along parting line 100 so that cavity portions 42 and 50 are directly adjacent to and in communication with one another. Since mold sections 18 and 20 are respectively connected to mold sections 16 and 22 by hydraulic cylinders 72 and 78, mold sections 16 and 22 are also caused to move generally horizontally toward one another and close at their respective matching faces along parting line 102 so that cavity portions 32 and 58 are directly adjacent to and in communication with one another. Both of parting lines 100 and 102 can be seen in the illustrated embodiment to be generally vertically oriented. Closure of the above described mold sections along parting lines 100 and 102 causes pinch off areas of mold sections 16 and 22, as indicated at 104, to sealingly pinch an upper end of parison 96. In addition, pinch off areas of mold sections 18 and 20, as indicated at 106, sealingly pinch a lower end of parison 96 therebetween and around blow pin 12. Of course, although not shown, a suitable opening is provided through mold sections 18 and 20 for blow pin 12. Finally in FIG. 6, it is shown that compression member 64 is still in its retracted position.

Figure 7:
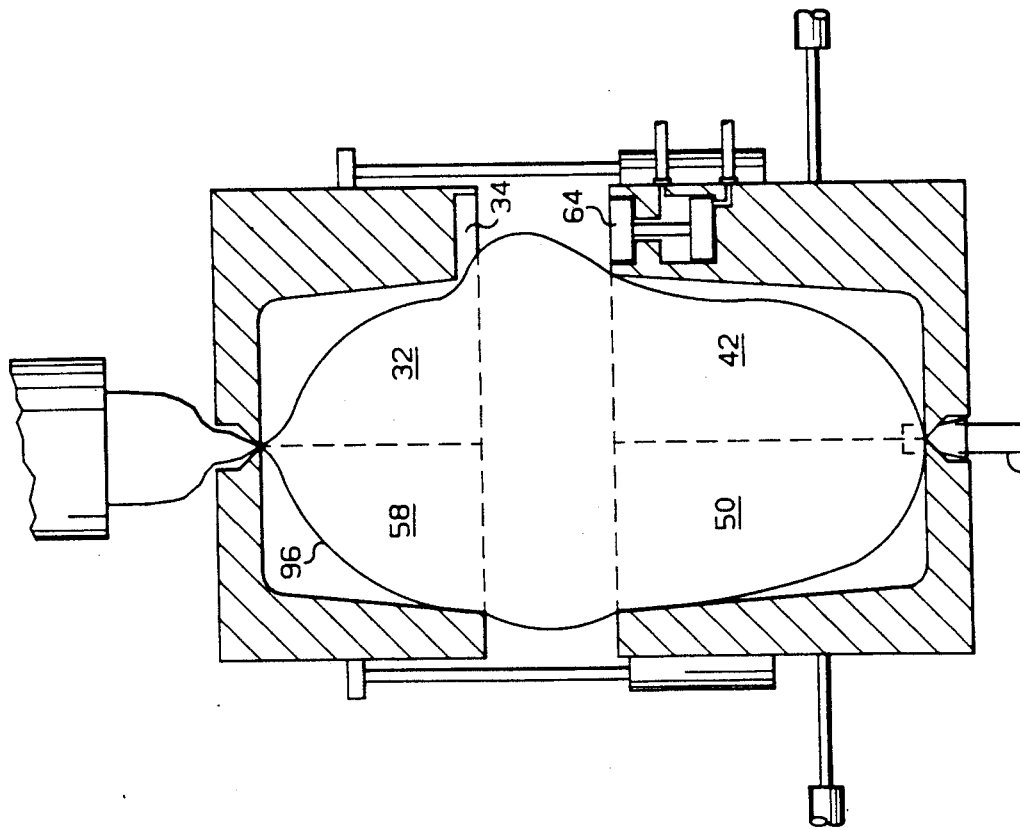

At the same time as or shortly after closure of the mold sections shown in FIG. 6, a first blow gas injection stage preferably begins, hereinafter referred to as the "preblow" stage, in which a blow gas such as air is injected from blow pin 12 into the interior of parison 96 so as to expand the parison within each of cavity portions 32, 34, 42, 50 and 58 as shown in FIG. 7. In addition and as shown, parison 96 also expands into open areas between cavity portion 34 and compression member 64 and between the horizontally extending faces of the various mold sections. A preferred pressure range for the preblow stage is about 5 to about 15 psi. As shown, compression member 64 is still preferably in the retracted position in the illustrated embodiment.

Figure 8:
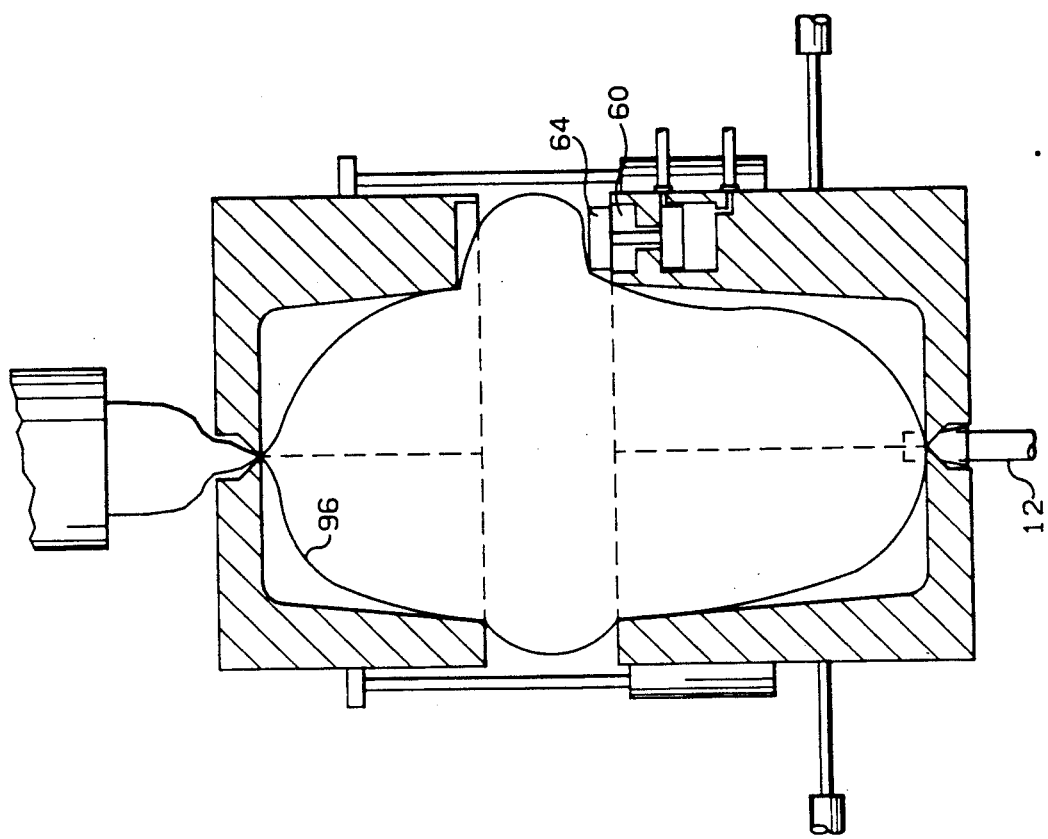

After the preblow stage is allowed to continue for a short period of time of, for example, about 0.5 to about 2 seconds, the blow gas pressure is elevated to a higher level of preferably about 15 to about 30 psi to begin what is hereinafter referred to as the "low pressure" stage. According to the illustrated embodiment, it is preferred that at the beginning of the low pressure stage or shortly thereafter compression member 64 is moved to its extended position as shown in FIG. 8. In such an extended position, compression member 64 is shown as being entirely outside of recess 60. However, a portion of compression member 64 could be allowed to stay within recess 60 if desired. It can also be seen from FIG. 8 that parison 96 has further expanded as compared to FIG. 7.

Figure 9:
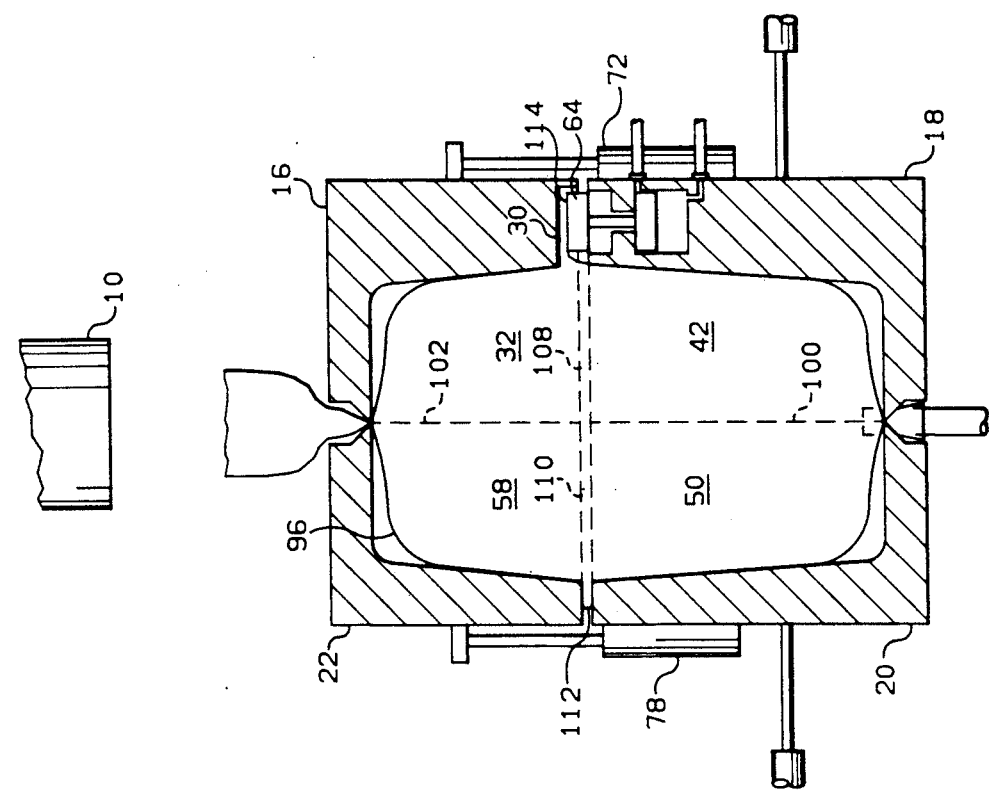

After the low pressure stage is allowed to continue for a predetermined period of time, such as for example about 2 to about 5 seconds, hydraulic cylinders 72 and 78 are activated to move respective mold sections 16 and 22 in a generally downward direction. As shown in FIG. 9, the uppermost end of parison 96 outside of the various mold sections is caused to tear away from extrusion head 10, and mold sections 16 and 22 are caused to close upon mold sections 18 and 20, respectively, at horizontally disposed matching faces along flash lines 108 and 110. This brings cavity portions 32 and 58 directly adjacent to and in communication with cavity portions 42 and 50, respectively. Flash lines 108 and 110 can be seen to be substantially continuous and lie in a generally horizontal plane so as to be perpendicular to substantially continuous parting lines 100 and 102 which lie in a generally vertical plane. Closing of the various mold sections along flash lines 108 and 110 causes formation of an outwardly extending rib as indicated at 112 via compression molding between the horizontally disposed matching faces of the various mold sections.

More importantly, closure of the mold sections as described immediately above causes compression member 64 as maintained in its extended position to be closely adjacent to interior surface portion 30. As described previously with reference to FIG. 1, interior surface portion 30 defines cavity portion 34. Compression member 64 accordingly presses a first portion of parison 96 against interior surface portion 30 so as to compression mold such first portion of parison 96. This forms a strong, substantially solid protruding member, as indicated at 114 which is at least partially offset from flash line 108 and entirely offset from parting line 102.

Figure 10:
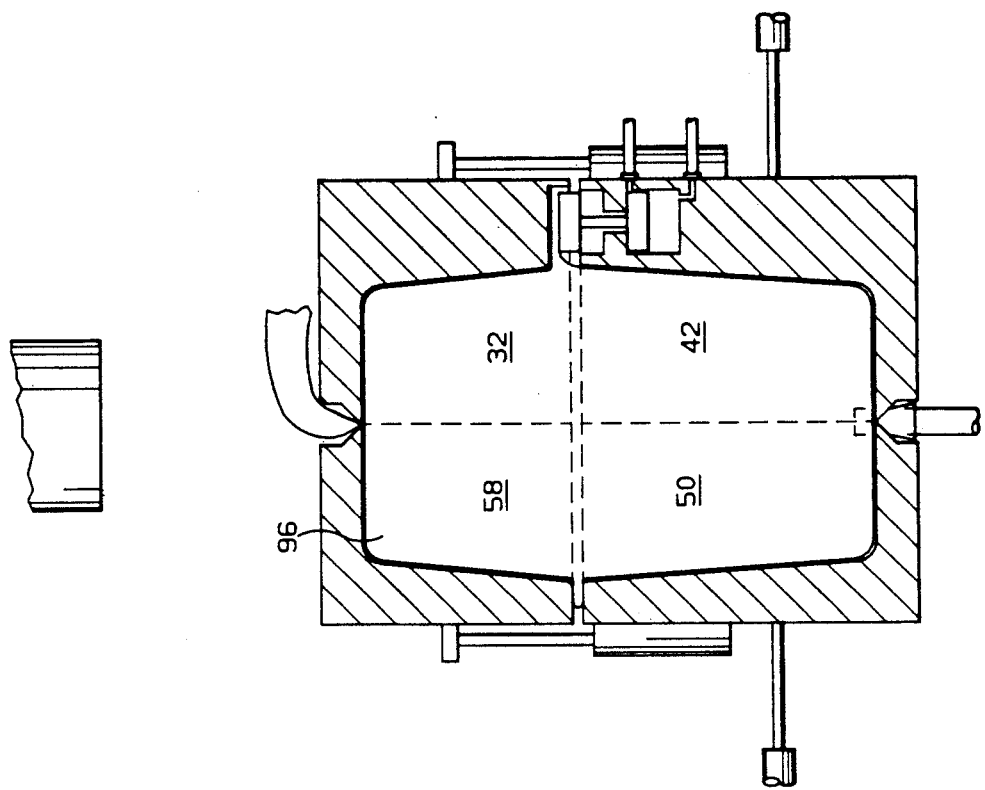

Further according to the illustrated embodiment, it is preferred that at a time of about 0 to about 5 seconds after closure of the various mold sections as shown in FIG. 9 and compression molding of protruding member 114, the blow gas pressure is elevated further to a pressure of preferably about 50 to about 100 psi. This begins a third blow gas injection stage hereinafter referred to as the "high pressure" stage. It is in this stage that inflation of parison 96 is completed so as to blow mold second, third, fourth and fifth portions of parison 96 within cavity portions 32, 42, 50 and 58, respectively, as shown in FIG. 10. The high pressure stage is typically carried out for about 1 to about 3 minutes, after which the various mold sections are opened and the molded article removed from the mold.

Figure 11:
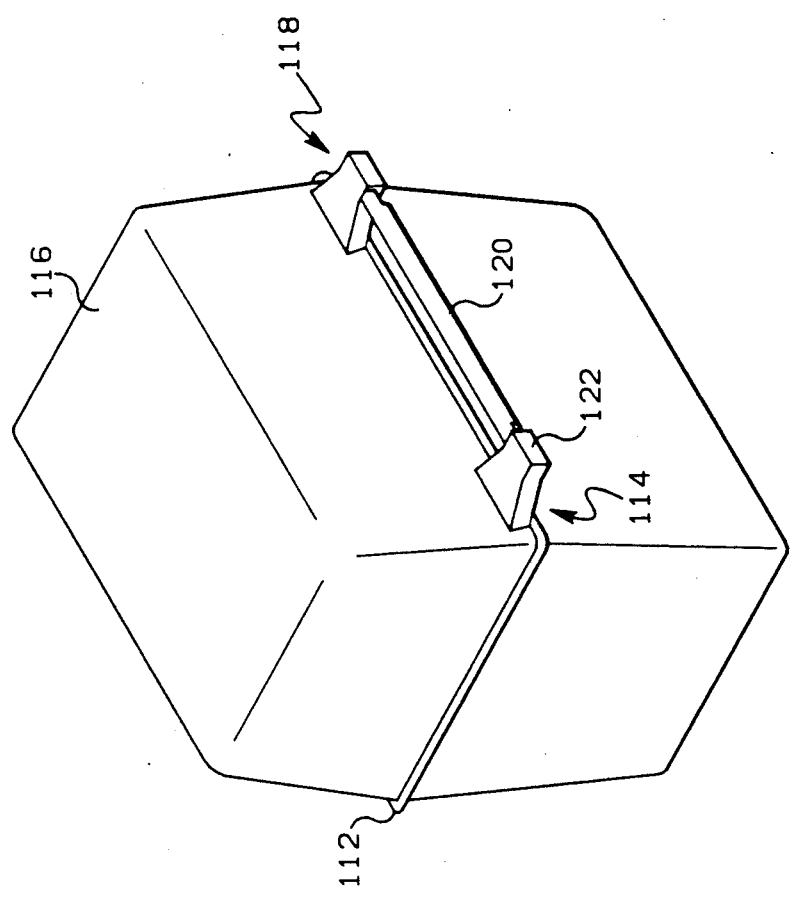
FIG. 11 is an isometric view of an article molded in accordance with the embodiment illustrated in FIGS. 1-10.

Referring now to FIG. 11, the article as molded in accordance with the illustrated embodiment is shown. The article comprises a hollow blow molded portion 116 having the outwardly extending rib 112, two compression molded protruding members as indicated at 114 and 118, and a generally cylindrical handle 120 extending between the compression molded protruding members 114 and 118.

Figure 12:
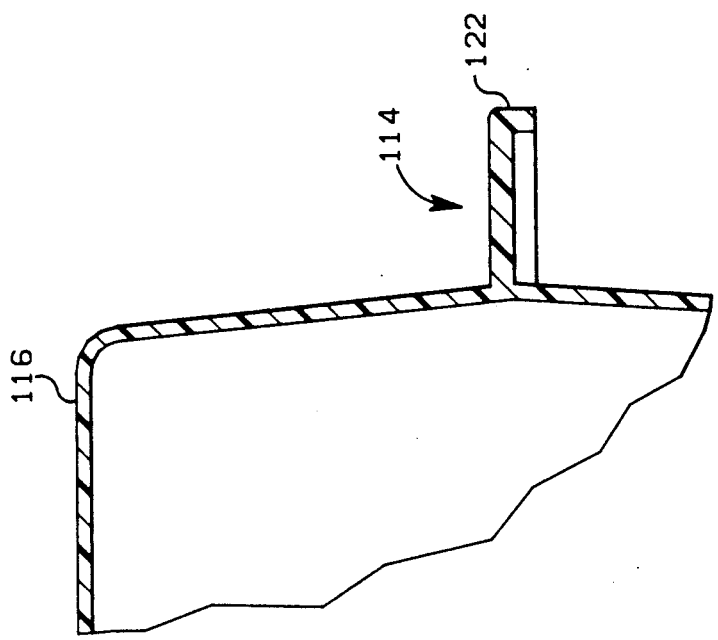
FIG. 12 is a cross sectional view of a portion of the article shown in FIG. 11.

Referring now to FIG. 12, there is shown a cross sectional view of a portion of the article of FIG. 11 which more clearly shows the structure of blow molded hollow portion 116 and compression molded protruding member 114.

An example will now be described to further illustrate the invention, but should not be construed to limit the invention in any manner.

Articles substantially as shown in FIGS. 11 and 12 were molded using an apparatus substantially similar to the apparatus of FIGS. 1–4, except that the apparatus of this example was adapted to compression mold only one protruding member in accordance with the invention whereas the other protruding member was blow molded into a hollow form. The steps employed in the molding method were substantially like those described previously and shown in FIGS. 5–10. The articles were molded with MARLEX HXM 50100-2 (high density polyethylene) using a shaped die adapted to extrude a parison 9 inches in diameter having a wall thickness of 300 mil. Air was used as the blow gas at the following pressures: preblow of 12 psi, low pressure blow of 18 psi, and high pressure blow of 90 psi. The extrusion head temperature was set at about 400° F.

Seven runs were made. In each run, the timing of various events with respect to a preselected zero time are set forth in Table I.

TABLE I

| Event | Time (secs.) |
| --- | --- |
| Start of parison extrusion | −9.8 |
| End of parison extrusion | 0 |
| Start closing mold section 16 upon section 22 and mold section 18 upon section 20 | 0 |
| Mold section 16 closed upon section 22 and mold section 18 closed upon section 20 | 8.3 |
| Preblow starts | 8.3 |
| Start upward movement of compression member 64 | 9.0 |
| Stop upward movement of compression member 64 so as to reach extended position | 9.2 |
| Preblow ends and low pressure blow starts | 9.2 |
| Start closing mold section 16 upon section 18 and mold section 22 upon section 20 | 12.4 |
| Mold section 16 closed upon section 18 and mold section 22 closed upon section 20 | 15.9 |
| Low pressure blow stops and high pressure blow starts | 16.8 |
| High pressure blow ends | 105.0 |
| Mold sections start to open | 117.0 |

Of the seven articles produced by the seven runs of this example, the protruding member of four of such articles was completely and well formed. In three articles, the protruding member was completely formed except for a part of only the end portion of the protruding member as indicated at 122 in FIGS. 11 and 12. End 122 is shown as vertically extending in FIG. 12. It is believed that this could have been prevented by further delaying extension of the compression member 64.

The above results in accordance with the invention compare very favorably with control runs which were carried out by maintaining compression member 64 in the extended position throughout the molding cycle. Such control runs consistently produced incomplete protruding members, most of which were only about half formed.

Obviously many modifications and variations of the present invention are possible in light of the above teachings. For example, a different sequence of blow gas injection stages could be utilized, such as only one or two stages. Another possible variation could involve delay of the extension of the compression member 64 until complete closure of the mold, whereby compression molding of the associated protruding member would occur upon compression member 64 reaching its extended position. It is therefore to be understood that within the scope of the appended claims the invention may be practiced otherwise than as specifically described.

That which is claimed is:

1. A molding apparatus comprising:
   extrusion means for extruding a molten generally tubular parison having a predetermined wall thickness;
   mold means for receiving said extruded parison, said mold means including a first interior surface portion which defines a first cavity portion and a second interior surface portion which defines a second cavity portion and also including a recess generally in alignment with said first cavity portion;
   blow means for injecting blow gas into the interior of said parison within said mold means so as to expand said parison within each of said cavity portions; and
   a compression member, having an exterior surface, which is mounted in said mold means so as to be reciprocable between a retracted position in which at least a portion of said compression member is disposed within said recess to an extended position in which at least a part of said compression member portion is outside of said recess, wherein in said extended position at least a portion of the exterior surface of said compression member is capable of being positioned to be closely adjacent to said first interior surface portion so as to press only a portion of said expanded parison of predetermined wall thickness against said first interior surface portion and thereby compression mold said parison portion.

2. An apparatus as recited in claim 1 wherein said first cavity portion is directly adjacent to and in communication with said second cavity portion.

3. An apparatus as recited in claim 2 wherein said second cavity portion has a periphery and wherein said first cavity portion extends outwardly from said periphery.

4. An apparatus as recited in claim 3 wherein said mold means includes a first mold section which defines said first and second cavity portions and a second mold section which has a third interior surface portion defining a third cavity portion, said second mold section having said recess therein and said compression member operably connected thereto, wherein at least one of said first and second mold sections is movable between an open position in which said mold sections are apart and a closed position in which said mold sections close upon one another along a first mold closing line so as to bring said second and third cavity portions directly adjacent to and in communication with one another and further wherein said compression member in its extended position is closely adjacent to said first interior surface portion when said mold sections are in the closed position.

5. An apparatus as recited in claim 4 wherein said first mold section has a first face and said second mold section has a second face which matches said first face such that said first and second mold sections are closable upon one another at said first and second faces along said first mold closing line, said first cavity portion having a first end and a second end such that said first cavity portion extends from said first end directly adjacent to said first face to said second end offset from said first face.

6. An apparatus as recited in claim 5 wherein said mold means further includes: a third mold section having a fourth interior surface portion which defines a fourth cavity portion therein and which is closable upon said second mold section along a second mold closing line so that said third and fourth cavity portions are directly adjacent to and in communication with one another; and a fourth mold section having a fifth interior surface portion which defines a fifth cavity portion therein and which is closable upon said third mold section along a third mold closing line so that said fourth and fifth cavity portions are directly adjacent to and in communication to one another, said fourth mold section also being closable upon said first mold section along a fourth mold closing line so that said fifth cavity portion is directly adjacent to and in communication with said second cavity portion.

7. An apparatus as recited in claim 6 wherein said first mold section further has a third face and said fourth mold section has a fourth face which matches said third face such that said first and fourth mold sections are closable upon one another at said third and fourth faces along said fourth mold closing line, said first cavity portion being offset from said third face.

8. An apparatus as recited in claim 7 wherein at least one of said first and second mold sections is movable between open and closed positions along a first directional line and wherein said compression member is reciprocable between said retracted and extended positions along a directional line generally parallel to said first directional line.

9. An apparatus as recited in claim 8 wherein at least one of said second and third mold sections is movable between open and closed positions along a second directional line generally perpendicular to said first directional line, at least one of said third and fourth mold sections is movable between open and closed positions along a directional line generally parallel to said first directional line, and at least one of said first and fourth mold sections is movable between open and closed positions along a directional line generally parallel to said second directional line.

10. An apparatus as recited in claim 9 wherein said first and third mold closing lines are substantially continuous and wherein said second and fourth mold closing lines are substantially continuous and generally perpendicular to said first and third mold closing lines.

11. An apparatus as recited in claim 10 wherein said first and third mold closing lines lie in a generally horizontal plane and said second and fourth mold closing lines lie in a generally vertical plane.

12. An apparatus as recited in claim 11 further comprising means for moving said mold sections between their respective open and closed positions.

13. An apparatus as recited in claim 4 further comprising reciprocating means, operably connected to said second mold section, for reciprocating said compression member between said retracted position and said extended position.

14. An apparatus as recited in claim 13 wherein said reciprocating means is hydraulically operable.

15. An apparatus as recited in claim 14 wherein a chamber separate from said third cavity portion is defined in said second mold section and wherein said reciprocating means comprises a piston slidably received within said chamber, a shaft having a first end connected to said piston and a second end connected to said compression member, and a pressurized fluid source connected to and in fluid communication with said chamber.

16. An apparatus as recited in claim 15 wherein in said retracted position the entire compression member is disposed within said recess, and in said extended position the entire compression member is positioned outside said recess.

* * * * *